(12) United States Patent
Bearson et al.

(10) Patent No.: US 12,082,592 B2
(45) Date of Patent: Sep. 10, 2024

(54) METHODS OF PRODUCING READY-TO-EAT BREAKAWAY MEAT PORTIONS

(71) Applicant: The Hillshire Brands Company, Chicago, IL (US)

(72) Inventors: Kent Bearson, Naperville, IL (US); Kasia Orbik, Lombard, IL (US); Forrest Tyler Tate, Enid, OK (US)

(73) Assignee: The Hillshire Brands Company, Springdale, AR (US)

( * ) Notice: Subject to any disclaimer, the term of this patent is extended or adjusted under 35 U.S.C. 154(b) by 350 days.

(21) Appl. No.: 17/319,838

(22) Filed: May 13, 2021

(65) Prior Publication Data

US 2022/0361516 A1 Nov. 17, 2022

(51) Int. Cl.
*A23B 4/06* (2006.01)
*A23J 3/04* (2006.01)
*A23L 13/40* (2023.01)

(52) U.S. Cl.
CPC ............ *A23B 4/064* (2013.01); *A23J 3/04* (2013.01); *A23L 13/426* (2016.08)

(58) Field of Classification Search
CPC . A23L 13/40; A23L 3/375; A23L 3/36; A23L 13/426; A23L 5/10; A23J 3/04; A23B 4/06; A23B 4/09; A23B 4/064
USPC ........................................................ 426/513
See application file for complete search history.

(56) References Cited

U.S. PATENT DOCUMENTS 5,731,029 A * 3/1998 Karwowski ............ A23K 50/42
426/805

* cited by examiner

*Primary Examiner* — Subbalakshmi Prakash
(74) *Attorney, Agent, or Firm* — Duane Morris LLP (57) ABSTRACT

A method may include grinding raw whole muscle meat into a ground meat material and heating the ground meat material to cook the ground meat material into a cooked ground meat material suitable for consumption. The method may also include freezing the cooked ground meat material and mixing the frozen and cooked ground meat material with an additive comprising a starch to produce a meat mixture. The method may further include pressing the meat mixture into a formed shape and slicing the formed shape into meat portions of a predetermined size.

9 Claims, 8 Drawing Sheets

METHODS OF PRODUCING READY-TO-EAT BREAKAWAY MEAT PORTIONS

FIELD

The present disclosure relates to apparatuses and methods for producing ready-to-eat breakaway meat portions. More particularly, the present disclosure relates to apparatuses and methods for producing predetermined sizes of meat portions that are fully cooked.

BACKGROUND

This section provides background information related to the present disclosure which is not necessarily prior art.

Various apparatuses and methods allow food producers and/or food processors to produce meat products in sizes and/or portions that have various characteristics. One type of meat product is a sliced, pulled and/or ground meat product that can be used in various recipes and to produce different types of sandwiches, meals and the like. Such meat products, for example, include meat products used to make a Philly Cheese Steak, pulled pork, pulled chicken, cubed or chunked ham or the like. Often, the meat used to create a Philly Cheese Steak is a thinly sliced and/or ground meat product that can be made from whole muscle meat. Pulled pork, pulled chicken or other pulled meat products can also be made from whole muscle meat that is then separated into striated muscle fiber.

Existing methods and apparatuses used to make meat products for use in Philly Cheese Steaks or in pulled meat products are often time consuming and costly. In addition, the end product can be difficult and time consuming for a consumer, chef, cook, restaurant, food service provider or other user to prepare into the final food product. There is a need, therefore, for more efficient methods and apparatuses for the production of meat products for use in Philly Cheese Steaks and in pulled meat products that is more efficient and less costly. In addition, there is a need for a meat product for use in Philly Cheese Steaks or pulled meat products that is more efficient and less costly during the preparation of the food product prior to consumption by a consumer.

SUMMARY

This section provides a general summary of the disclosure, and is not a comprehensive disclosure of its full scope or all of its features.

In some embodiments in accordance with the present disclosure, a method of producing meat portions is provided. The method may include grinding raw whole muscle meat into a ground meat material and heating the ground meat material to cook the ground meat material into a cooked ground meat material suitable for consumption. The method may also include freezing the cooked ground meat material and mixing the frozen and cooked ground meat material with an additive comprising a starch to produce a meat mixture. The method may further include pressing the meat mixture into a formed shape and slicing the formed shape into meat portions of a predetermined size.

In one aspect, the frozen and cooked ground meat material can have a temperature of approximately 5 to 19 degrees Fahrenheit when the ground meat material is mixed with the additive.

In another aspect, the starch includes a potato-based, corn-based or rice-based starch.

In another aspect, the starch can be added in an amount of 0.5 to 3 percent of the meat mixture by weight.

In another aspect, the formed shape can maintain the formed shape until the formed shape is sliced into the meat portions.

In another aspect, the step of slicing the formed shape into meat portions can be performed using an ultrasonic slicer.

In another aspect, the method may also include packaging a plurality of the meat portions together in a package wherein the plurality of meat portions is configured to separate into individual meat portions prior to consumption.

In another aspect, the meat portions can be meat patties.

In another aspect, the step of mixing the frozen and cooked ground meat material with the additive can be performed for about 2 to 3 minutes.

In another aspect, the frozen and cooked ground meat material can be mixed with the additive in a paddle blender.

In some embodiments, an apparatus for producing meat portions is provided. The apparatus may include a grinder operable to grind whole muscle meat into a ground meat material and a heater operable to cook the ground meat material into a cooked ground meat material suitable for consumption. The apparatus may also include a freezer operable to freeze the cooked ground meat material and a mixer operable to mix the frozen and cooked ground meat material with an additive comprising a starch to produce a meat mixture. The apparatus can also include a press operable to press the meat mixture into a formed shape and a slicer operable to slice the formed shape into meat portions of a predetermined size.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the present disclosure the singular forms "a," "an," and "the" include the plural reference, and reference to a particular numerical value includes at least that particular value, unless the context clearly indicates otherwise. When values are expressed as approximations, by use of the antecedent "approximately" or "about," it will be understood that the particular value forms another embodiment. As used herein, "about X" or "approximately X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The apparatuses and methods of the present disclosure can be used to produce a ready-to-eat meat portion that can originate as a whole muscle meat. In one example, the meat portion is a portion that can be used to make a Philly Cheese Steak. In other examples, the methods and apparatuses can be applied to other types of whole muscle and other meats to make other sandwiches, entrees, dishes and other food products. Such other types of meat products can include pulled or chunked meat products including pulled pork, pulled chicken, chunked pork, chunked chicken, cubed ham products and the like. In the context of the present disclosure, the term ready-to-eat means a product that can be safely consumed by a consumer when it is removed from the package. While the ready-to-eat product may be frozen or may be contained in a form or other shape that can be subsequently changed, warmed or otherwise heated after it is removed from its packaging, the product can still be described as ready-to-eat because the product can be safely consumed out of the package. In the context of a meat portion that can be used to make a Philly Cheese Steak or a pulled meat sandwich, the meat portion can be ready-to-eat despite the fact that it may be thawed, heated, and/or separated for placement on bread, a roll, bun, wrap or other product before it is served and/or consumed by a consumer.

In existing processing methods, meat processors often provide meat in a shaved or sliced form to a consumer or a food provider. In one example, existing methods and apparatuses provide the meat in an uncooked form. The food preparer is then required to thaw the meat and cook the meat before the food product (e.g., a Philly Cheese Steak) is served to a consumer. This existing method of providing meat can result in unnecessary waste if a food provider thaws too much of the uncooked meat and then subsequently does not have the need to prepare all the thawed meat into finished products. Similar issues can arise in the context of preparing a pulled, chunked or cubed meat food product. The food preparer is typically required to have a flat-top grill or similar cooking surface in order to cook the meat product. In addition, this method of providing meat can require a longer time to prepare than if the meat is cooked and/or in a ready-to-eat form when it is sold and/or delivered to the food provider or consumer.

The methods and apparatuses of the present disclosure are improvements over existing processes because the meat is portioned and is fully cooked at the meat processor before it is packaged and delivered to the food preparer. The meat is divided into easily separable meat portions before the meat is packed and delivered. The portioned meat, therefore, allows a food preparer to separate only those quantities of meat that it needs from the full package. In this manner, less meat is prone to be wasted and can result in cost savings for the food preparer. In addition, the meat is fully cooked and/or ready-to-eat such that the steps to prepare the meat for consumption are faster for the food preparer. In addition, simple heating equipment can be used by the food preparer in order to produce the food product (e.g., a Philly Cheese Steak, pulled meat sandwich, chunked or cubed meat product) for consumption. These improvements can result in efficiencies, cost savings and increased customer satisfaction.

Figure 1:
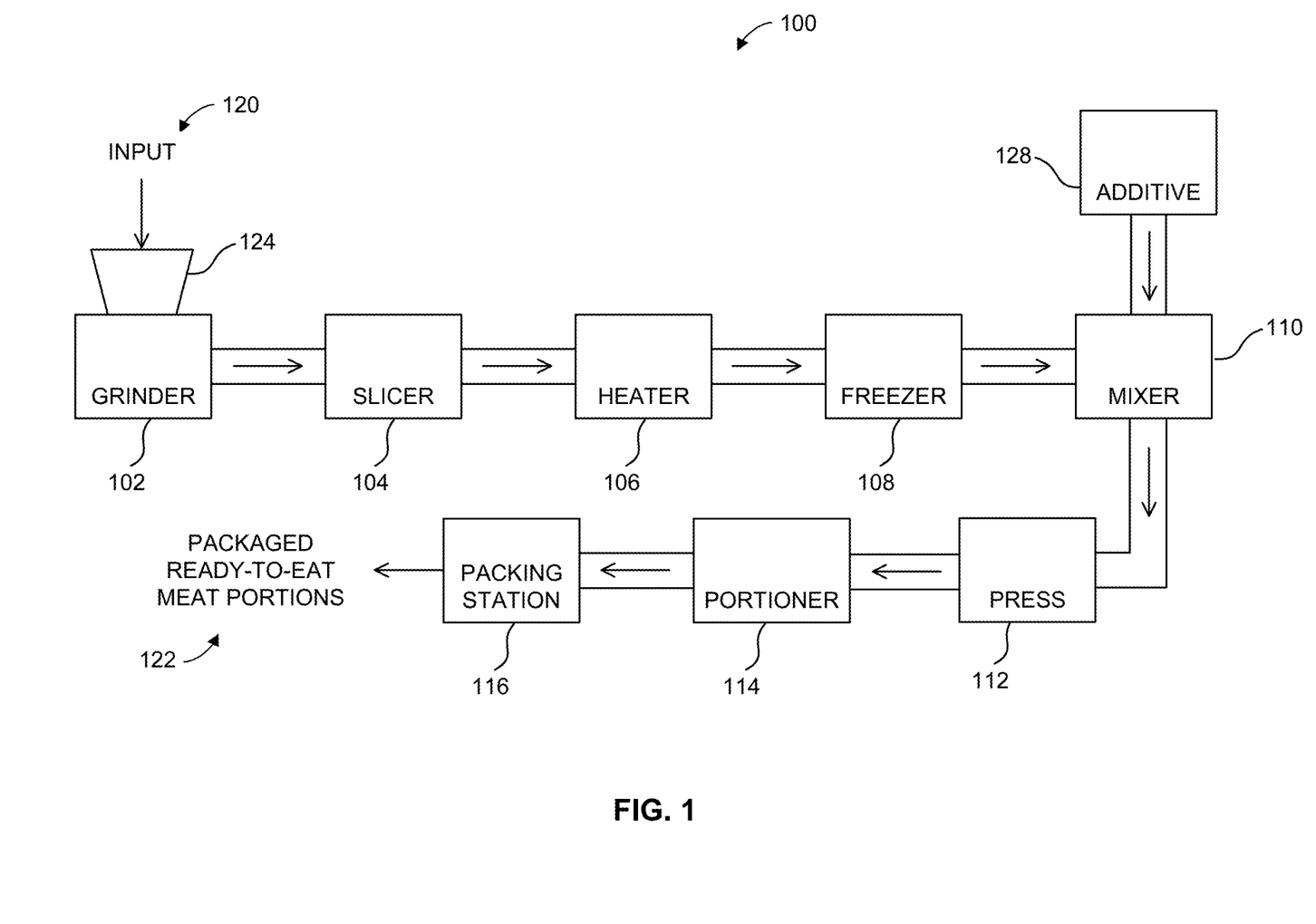
FIG. 1 is a diagram illustrating an example meat portioning apparatus in accordance with the present disclosure.

Turning now to FIG. 1, an example apparatus 100 for the preparation of meat portions is shown. The meat portioning apparatus 100 can include a grinder 102, a slicer 104, a heater 106, a freezer 108, a mixer 110, a press 112, a portioner 114 and a packing station 116. The grinder 102, the slicer 104, the heater 106, the freezer 108, the mixer 110, the press 112, the portioner 114 and the packing station 116 can be operatively coupled together such that a meat can be transferred from one element of the apparatus 100 to the next during processing of meat into ready-to-eat meat portions 122. Such transfers can be performed manually by operators or can be performed automatically and/or mechanically by suitable conveyors, rollers, piping or the like. In still other examples, the transfers can be a combination of manual transfers and automatic or mechanical transfers.

Figure 2:
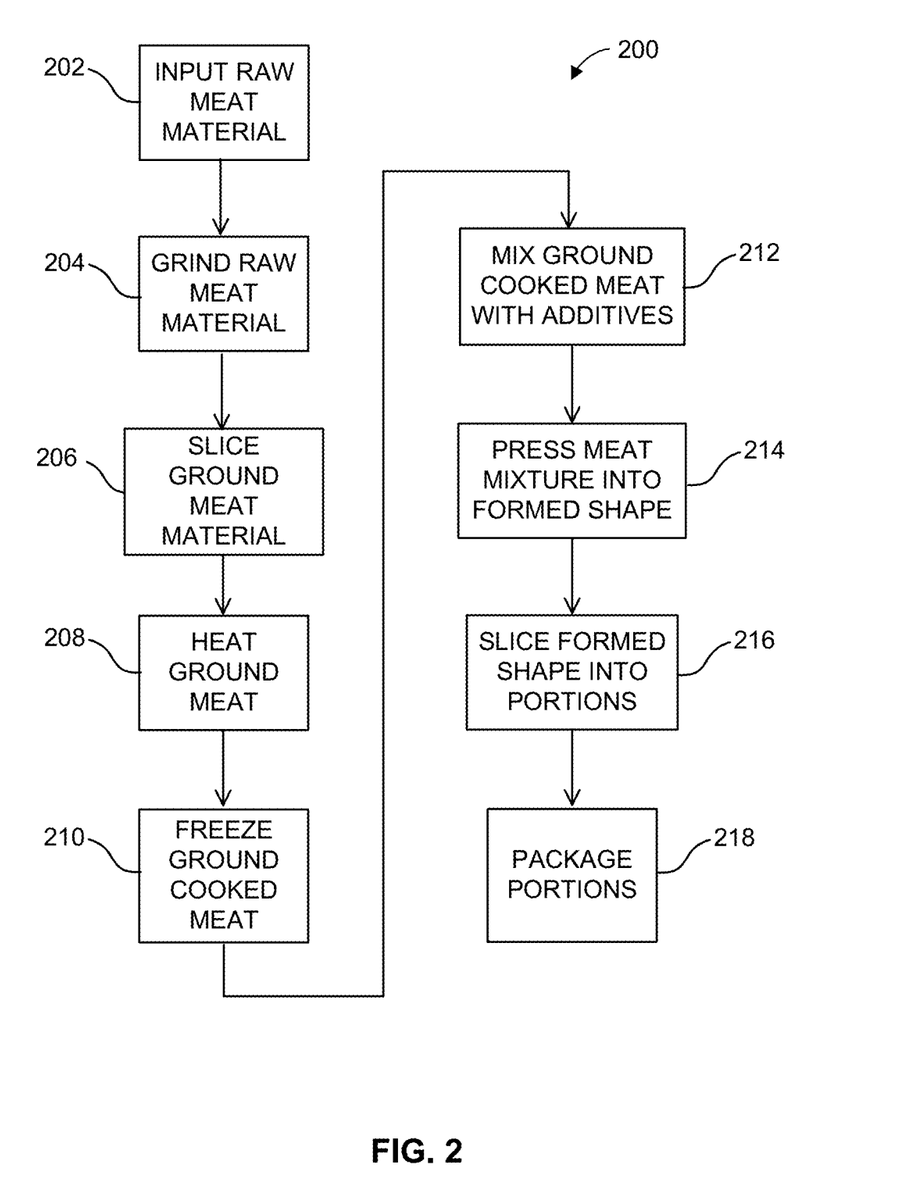
FIG. 2 is a flow chart illustrating an example method of producing meat portions in accordance with the present disclosure.

Referring now to FIG. 2, an example method 200 of producing meat portions is shown. The method 200 can be performed, for example, using the apparatus 100 of FIG. 1. The method 200 can begin at step 202 when raw meat material is input in the apparatus 100. The raw meat material 120 can be input into a hopper 124, for example. The hopper 124 can be any suitable hopper for food processing such as a stainless steel bin or like that is shaped to funnel the raw meat material toward the grinder 102. In other examples, the raw meat material 120 can be input into an opening, onto a conveyor or otherwise input for further processing.

The raw meat material 120 can be various types of meats and, in one example, is whole meat muscle. The whole meat muscle can be large portions of animal muscle such as pieces of muscle weighing one pound or more. In other examples, the raw meat material 120 can be other types of meat or animal products, including meat scraps, meat pieces less than one pound, animal pieces and the like.

At step 204, the raw meat material can be ground into a ground meat material. The raw meat material can be ground to any desired size. In one example, the raw meat material is ground to have a size (or diameter) of approximately one inch. In other examples, the raw meat material can be ground to smaller sizes. In still other examples, the raw meat material can be ground to have pieces larger than one inch. The raw meat material 120 can be ground using any suitable grinder 102. Commercial grinders or choppers can be used.

At step 206, the ground meat material can be sliced. The ground meat material can be sliced or shaved to have a suitable meat size for the desired food product. In the example of a Philly Cheese Steak, the meat is typically shaved to have a thickness of approximately 2 mm. In other examples, the ground meat product can be sliced or otherwise further processed to have a size or consistency that is desired in the final food product. For pulled meat products, for example, the meat material can be pulled apart using a shredder, a dicer or chunker that can separate the meat material into a suitable meat consistency for the pulled meat product. In some examples, a pulled meat product can be cut or chunked into pieces having a size of a one-half inch cube or greater. The meat material can, for example, be pumped from the grinder 102 to a suitable slicer 104. The slicer 104 can be rotary slicer in one example. In other examples, other slicers, shredders or cutters can be used.

While not shown, the ground meat material can also be mixed with flavorings, marinades, seasoning and other materials. This mixing can be performed after step 204 or after step 206. The mixing can be performed in a suitable mixer such as in a vacuum mixer. The mixing can be performed in order to add flavor or seasoning to the meat that is desired in the final food product.

At step 208, the ground meat material can be heated. The ground meat material can be heated in order to fully cook the meat material. The meat material can be heated, for example, until the meat has an internal temperature of approximately 165° F. In other examples, the meat can be cooked to other temperatures that make the meat safe to consume. The meat material can be heated using the heater 106, for example. The heater 106 can be any suitable oven or other device that can raise the internal temperature of the meat. The heater 106 can be an impingement oven, an induction oven, infrared oven, convection oven, or the like. In still other examples, the heater 106 can be a steam cabinet, a smokehouse or other cooking device that may be appropriate for the type of meat being heated in order to impart taste, texture or other cooked properties that may be desired. At step 208, the meat material can be conveyed through a stationary oven or can be transferred into an oven for a period of time.

At step 210, the ground cooked meat material is frozen. The ground cooked meat material can be flash frozen or subjected to any suitable process to lower the temperature of the ground cooked meat material to a temperature between about 5 to about 19° F. In one example, the ground cooked meat material is frozen using an individual quick freezing (IQF) process. In other examples, the ground cooked meat material can be frozen using liquid nitrogen, dry ice or other suitable freezing processes.

At this stage of the process, the frozen meat material is suitable for consumption and could be packed and shipped to a food preparer. The frozen meat material in the form at this stage of the process is not portioned into a desired shape or quantity of meat material. In addition, if the meat material is packaged in bulk in the form after step 210, the meat material is likely to adhere together in a single mass of meat material and will be difficult to separate into individual portions by the food preparer. The method 200 includes further processing to remedy these issues and are improvements over other processes and apparatuses.

At step 212, the ground cooked meat is mixed with additives. The ground cooked meat is maintained at a temperature below freezing and in one example, is maintained at a temperature between about 5 to about 19° F. In yet another example, the ground cooked meat is maintained at a temperature of about 10 to about 17° F. In yet another example, the ground cooked meat is maintained at a temperature less than or equal to about 15° F. The ground cooked meat can be mixed with a suitable binding additive in order to allow the ground meat material to be shaped into a formed shape at step 214. In one example, the additive is a starch material. For example, the starch material can be a quick acting starch such as a pregelatinized modified potato starch or a maize-based cold water swelling modified food starch. In still other examples, the starch material can be a potato-based, corn-based or rice-based food starch.

The additive can be mixed with the ground cooked meat in order to permit the ground cooked meat to be subsequently shaped into a formed shape while also maintaining a desired consistency. In one example, the additive can be added to the ground cooked meat in an amount of about 0.5 to about 3% by weight. Tests have shown that an amount less than about 1% tends to result in a ground cooked meat material that crumbles during subsequent processing. Amounts of additive greater than about 3% tends to have a consistency that is undesirable in a final food product. The above test results were conducted with a beef material. If other types of meats or other food products are prepared (other than Philly Cheese Steaks), the amount of additive may be different than the amounts described above.

In the apparatus 100, the additive 128 can be mixed with the ground cooked meat in the mixer 110. The mixer 110 can be paddle blender, for example. The additive and the ground meat material can be mixed in a paddle blender for approximately two minutes. In another example, the cooked ground meat is mixed with the additive for predetermined period of time between about two and about three minutes. The additive and the ground meat material do not need to be mixed under a vacuum. During the mixing process, the ground meat material is maintained at approximately 5 to 19° F. The ground meat material can also be maintained at a temperature of approximately 8 to 12° F. The mixing can be performed for time periods other than two minutes but it is desirable that the additive is evenly mixed and dispersed throughout the ground cooked meat. When evenly mixed, the ground cooked meat becomes a meat mixture with suitable characteristics such as texture, consistency, temperature, etc. for further processing.

While not shown, the meat mixture can be allowed to set-up or activate after the mixing step 212. The meat mixture can be allowed to stand to allow the starch to activate to bind the meat mixture together. This can assist in making the meat mixture more likely to maintain its shape after the meat mixture is pressed or subsequently formed into a predetermined shape. The stand time for the meat mixture can be any suitable period of time such as for one minute. In other examples, the stand time can be more or less than one minute. During such stand time, the meat mixture may not be mixed or otherwise processed. In some examples, the stand time can correspond to a transfer time during which the meat mixture is moved to from the mixer to subsequent processing stations. The moisture content of the meat mixture can determine whether a stand time is desirable during the method 200. In some meat mixtures with low moisture, such as in some pulled meat products, a stand time can be desirable to allow the starch that is added at step 212 to activate. The period of time for the stand time can be determined by an amount of moisture in the meat mixture, for example. Generally, the period of time for the stand time can be inversely related to the moisture content of the meat mixture. In other meat mixtures with a higher moisture content, no stand time may be required.

At step 214, the meat mixture is pressed into a formed shape. The meat mixture can be transferred, for example, from the mixer 110 to the press 112. The press 112 can be any suitable food grade press such as a hydraulic food press. The press 112 can be a side-load press that can form the meat mixture into a desired shape. In another example, the press 112 can be a top-load press that can form the meat mixture into a desired shape. The formed shape can be substantially cylindrical or have a log shape. The outer profile of the log shape can be rounded and the log can have a length of any suitable size. In some examples, the press 112 can form the meat mixture into a continuous log shape. In other example, the press 112 can form the meat mixture in a log shape with a predetermined length. In still other examples, the formed shape can have other outer profiles such as circular, oval, kidney-shaped, rectangular, dome-shaped, or other suitable shapes.

The press 112 can use any suitable forming mechanisms to form the meat mixture into the formed shape. For example, the press 112 can include a hydraulic cylinder that can use a form, mold, die or other suitable forming member and apply pressure to cause the meat mixture to be pressed into the formed shape. In one example, the press 112 can use a pressure level of about 1800 psi to press the meat mixture into the formed shape. During the forming process, the meat mixture can be maintained at a temperature below freezing. In one example, the meat mixture is maintained at a temperature in the range of about 5 to about 15° F. In another example, the meat mixture can be maintained at a temperature of less than about 20° F. during the forming process. The forming process causes the temperature of the meat mixture to rise due to friction in the press 112. The temperature of the meat mixture can be maintained at an appropriate input temperature (e.g., between about 5 and about 15° F.) so that the temperature of the meat mixture is less than about 20° F. when the formed shape exits the press 112.

Figure 3:
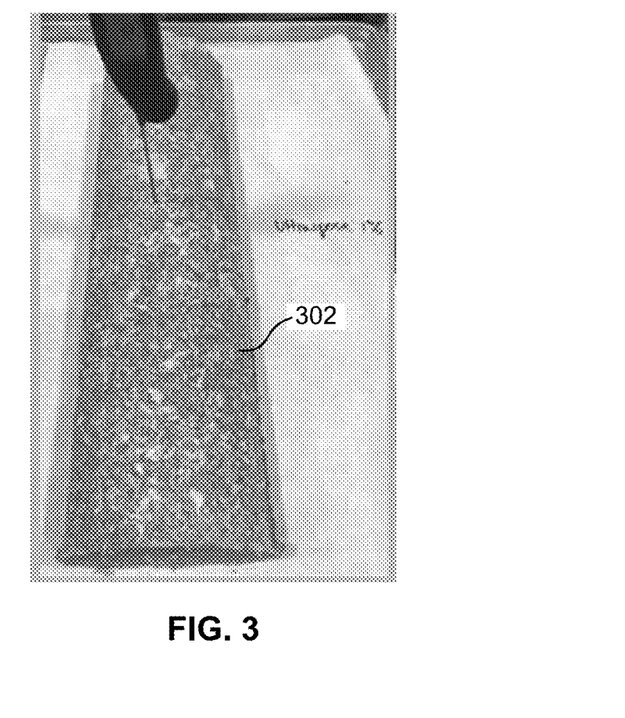
FIG. 3 is an illustration showing an example formed shape produced during processing of the meat portions of the present disclosure.

As shown in FIG. 3, the press 112 can form the meat mixture into a formed log 302. The log 302 can be formed into any suitable length and have a predetermined outer profile as previously described. The meat mixture with the included binding additive allows the log 302 to maintain its shape despite being formed from a ground meat mixture. If the additive is not present, the log formed from the meat mixture tends to fall apart after exiting the press 112. With the additive, the log 302 maintains the formed shape during subsequent processing.

The method 200 can continue to step 216. At step 216, the formed shape (e.g., the log 302) can be sliced into meat portions 502 (see FIG. 5). The meat portions 502 can be of any predetermined size. The size can be determined, for example, by a thickness of the slice that is separated from the log 302. The slice thickness can be about 12 mm for example. In other examples, the thickness can be in the range of about 10-25 mm. In still other examples, the thickness can be in the range of about 5-35 mm. In still other examples, the size of the meat portion 502 can be determined by a weight of the meat portion. In some examples, the meat portion 502 can have a weight between about 0.1 to 0.7 pounds. In other examples, the meat portion 502 can have a weight of approximately 0.25, 0.5, 0.75 or 1.0 pounds. In still other examples, the meat portion 502 can be sized so as to correlate to a serving size or to a number of food products. For example, the meat portions 502 can be sized to be one, two, three or more serving sizes or can be sized to produce one, two, three, four or more food products such as Philly Cheese Steaks. As shown, the meat portions 502 can be shaped as meat patties. In other examples, the meat portions have other shapes such as nuggets, strips, and the like.

The log 302 can be transferred from the press 112 to the portioner 114 so that the log 302 can be sliced into the meat portions 502. On one example, a conveyor or other suitable transfer mechanism can transfer the log 302 to the portioner 114. The portioner 114 can be a slicer such as an ultrasonic slicer, rotary slicer or the like. In other examples, the portioner 114 can be separate the formed shape into meat portions 502 using other processing methods such as by die-cutting, scooping, pressing, or the like.

Figure 4:
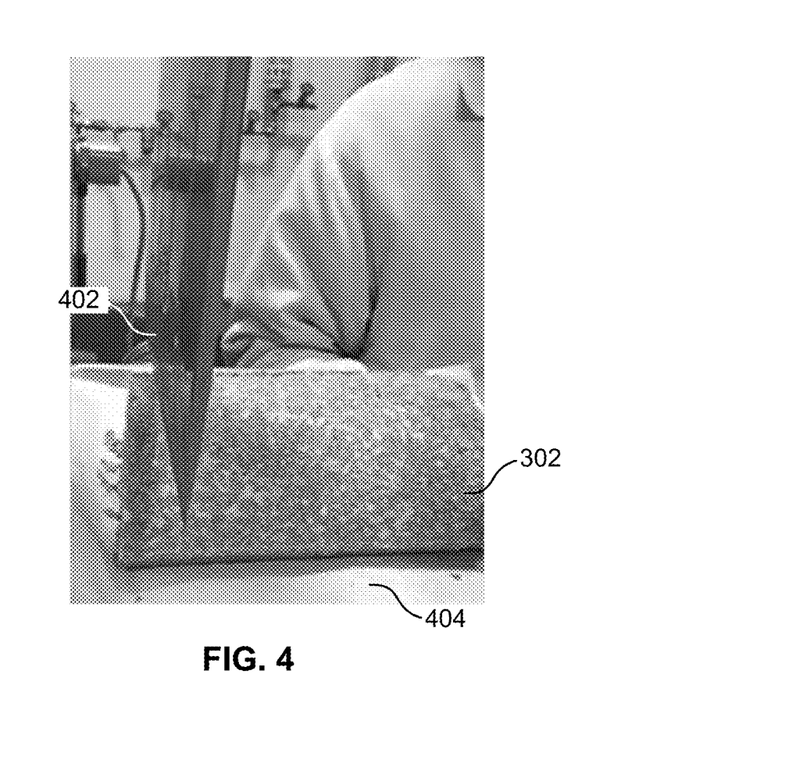
FIG. 4 is an illustration of an example portioner in accordance with the present disclosure.
Figure 5:
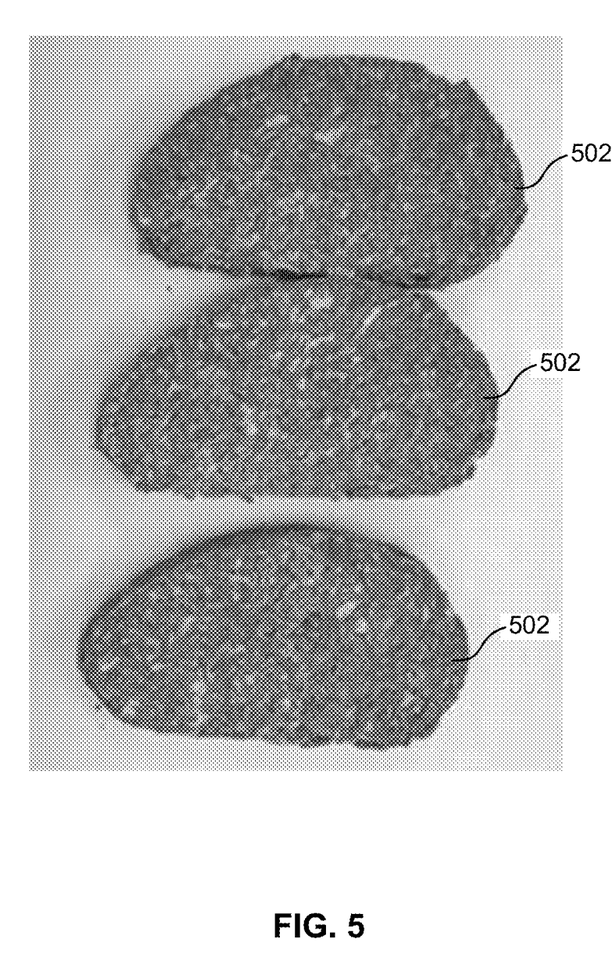
FIG. 5 is an illustration of example meat portions that can be created using the methods and apparatuses of the present disclosure.

In the example shown in FIG. 4, the log 302 can pass under an ultrasonic blade 402. The ultrasonic blade 402 can move relative to the platform 404 that supports the log 302. In this manner, the ultrasonic blade 402 can slice or cut the log 302 into the meat portions 502. The ultrasonic blade 402 can vibrate at a desired frequency while the blade 402 moves through the log 302. While this action is performed, the log 302 (or other formed shape) can be maintained at a temperature at or below about 20° F. In this condition, the meat portions 502 can be separated cleanly from the log 302.

The method 200 can then move to step 218. At step 218, the meat portions 502 can be packaged. For example, the meat portions 502 can be transferred to the packing station 116. In the packing station 116, the meat portions can be bundled together and vacuum packed in film or can be placed into boxes in which the meat portions 502 are separated by wax paper or other suitable separator. After packing, the packaged ready-to-eat meat portions 122 are ready for shipment, deliver and/or sale to a consumer.

The packaged ready-to-eat meat portions 122 are improvement over existing meats that may be processed and packaged for use in food products. For example, the meat portions 502 in the packages are breakaway portions. As can be appreciated, the meat portions 502 can be easily separated by a consumer into the meat portions 502. Thus, individual quantities or individual servings can be prepared by the food preparer. In this condition, less meat can be wasted and food products can be efficiently prepared by the food preparer.

In addition, the meat portions 502 are ready-to-eat. Since the meat portions 502 were cooked (at step 208, for example), the meat portions 502 only need to be re-heated or warmed by the food preparer. Unlike existing meat products, the food preparer does not need a full kitchen, flat-top grill or a conventional oven to prepare the meat. The meat portions 502 can be steamed, microwaved or otherwise warmed before being delivered to a consumer. Another benefit of the meat portions 502 that are provided in a ready-to-eat condition is that there is less grease buildup during preparation by the food preparer. Grease from the meat is expelled during the cooking of the meat in the heater 106 and/or during step 208. Thus, when the meat portions 502 are heated or otherwise prepared by a food preparer, less grease is produced than would otherwise be produced if the meat was raw and/or not fully cooked.

Figure 6:
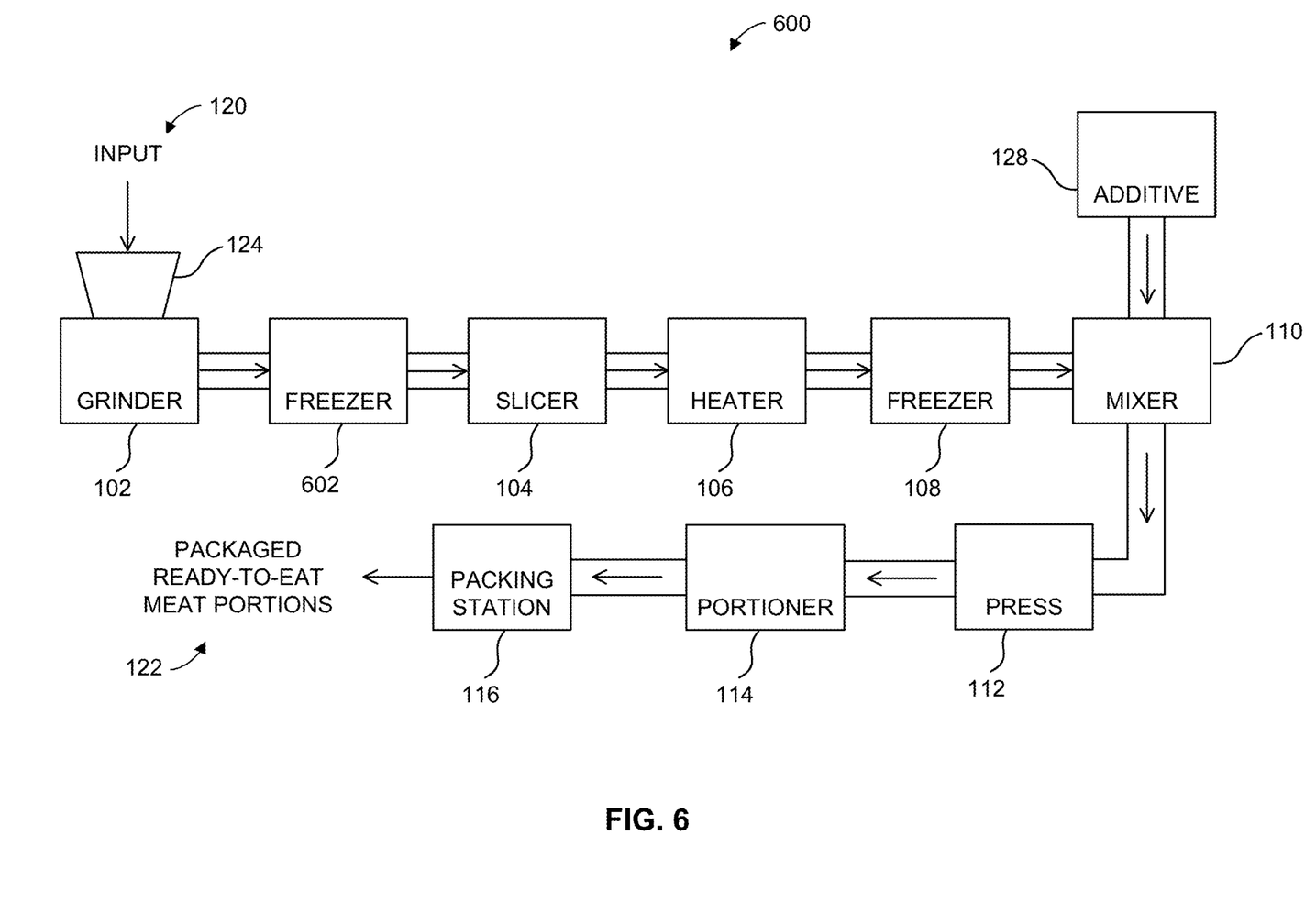
FIG. 6 is a diagram illustrating another example meat portioning apparatus in accordance with the present disclosure.

Referring now to FIG. 6, another example meat portioning apparatus 600 is shown. The meat portioning apparatus 600 can be similar in many aspects to the meat portioning apparatus 100 previously described. For the sake of brevity, those aspects of the meat portioning apparatus 600 that are substantially the same as the meat portioning apparatus 100 are not repeated.

One aspect of the meat portioning apparatus 600 that can be different from the meat portioning apparatus 100 is the freezer 602. The meat portioning apparatus 600 can include a second freezer 602. The second freezer 602 is in addition to the freezer 108 previously described. The second freezer 602 can be positioned downstream of the grinder 102 and upstream of the slicer 104 as shown in FIG. 6. The second freezer 602 can be similar to the freezer 108 in that the second freezer 602 can lower the temperature of the meat material that exits the grinder 102 before the meat material is processed by the slicer 104. The second freezer 602 can be any suitable freezer that can lower the temperature of the meat material to a temperature between about 5 and about 19° F. In other examples, the freezer 602 can lower the temperature to other suitable temperatures to make the processing of the meat material easier and/or to prevent the development of contaminants in the meat material such as bacteria and the like.

Figure 7:
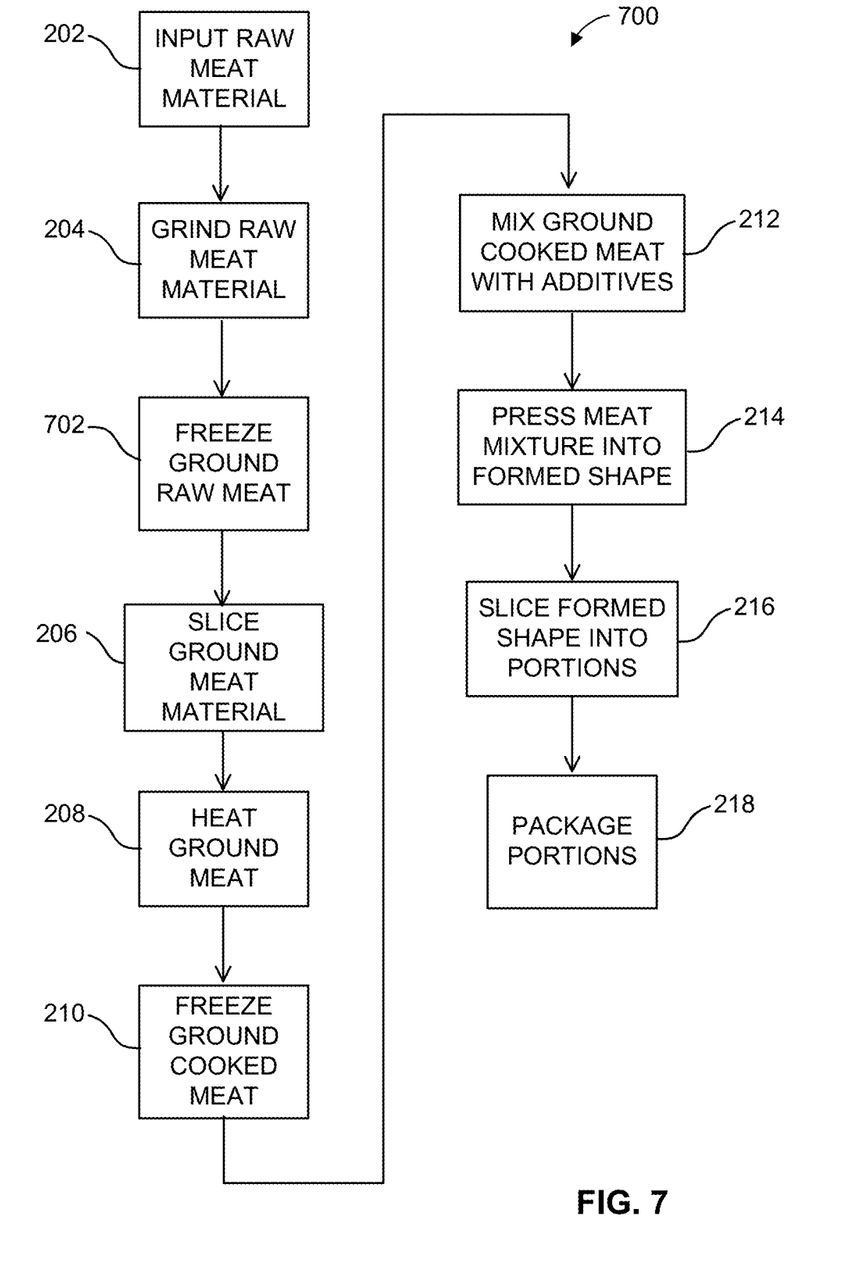
FIG. 7 is a flow chart illustrating another example method of producing meat portions in accordance with the present disclosure.

Referring now to FIG. 7, a sample method 700 of portioning a meat material is shown. The method 700 can be similar to the method 200 previously described. For the sake of brevity, those aspects and steps of the method 700 that are substantially the same as method 200 are not repeated.

Method 700 can be performed, in some examples, by the apparatus 600 previously described. The method 700 can differ from the method 200 in one aspect by including step 702. At step 702, the ground raw meat can be frozen. The raw meat can be frozen, for example, by the second freezer 602 of meat portioning apparatus 600 previously described. Any suitable process can be used to freeze the raw meat at step 702. In some examples, the raw meat material can be flash frozen or frozen using an individual quick freezing (IQF) process. In other examples, liquid nitrogen, dry ice or other processing methods can be used to freeze the raw meat. After step 702, the method 700 can proceed to step 206 as previously described with respect to method 200.

Figure 8:
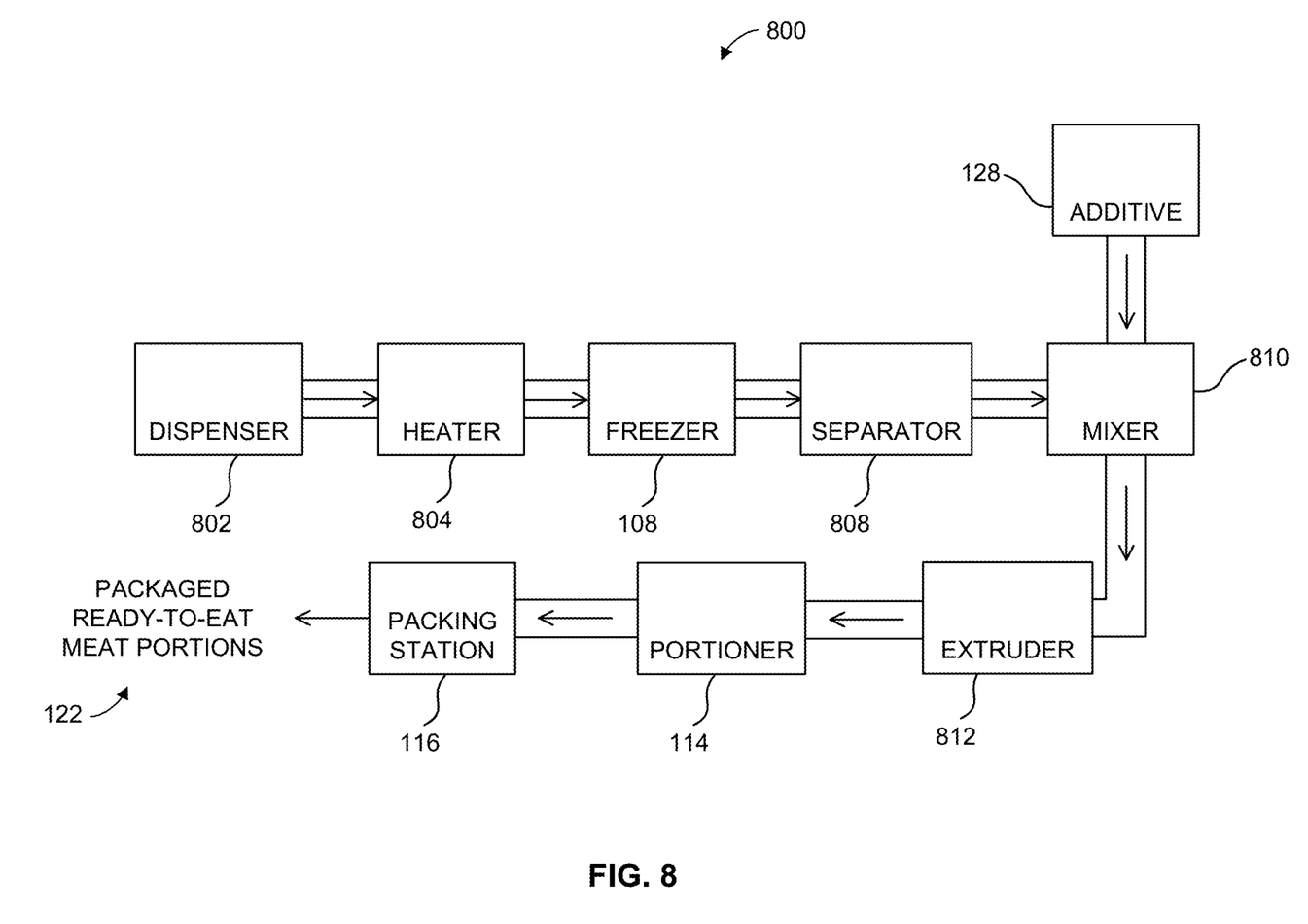
FIG. 8 is a diagram illustrating another example meat portioning apparatus in accordance with the present disclosure.

Referring now to FIG. 8, another example meat portioning apparatus 800 is shown. The apparatus 800 can be used, for example, to produce ready-to-eat meat portions that can be used to make a pulled meat product. The apparatus 800 can include a dispenser 802, a heater 804, a freezer 108, a separator 808, a mixer 810, an extruder 812, a portioner 114 and a packing station 116. The apparatus 800 can operate, for example, to process raw meat material (such as whole muscle meat) into ready-to-eat meat portions 122. The ready-to-eat meat portions 122 can be fully cooked portions of pulled pork or pulled chicken. Some aspects of the apparatus 800 can be similar to the elements or aspects of the apparatus 100 or the apparatus 600 previously described.

Figure 9:
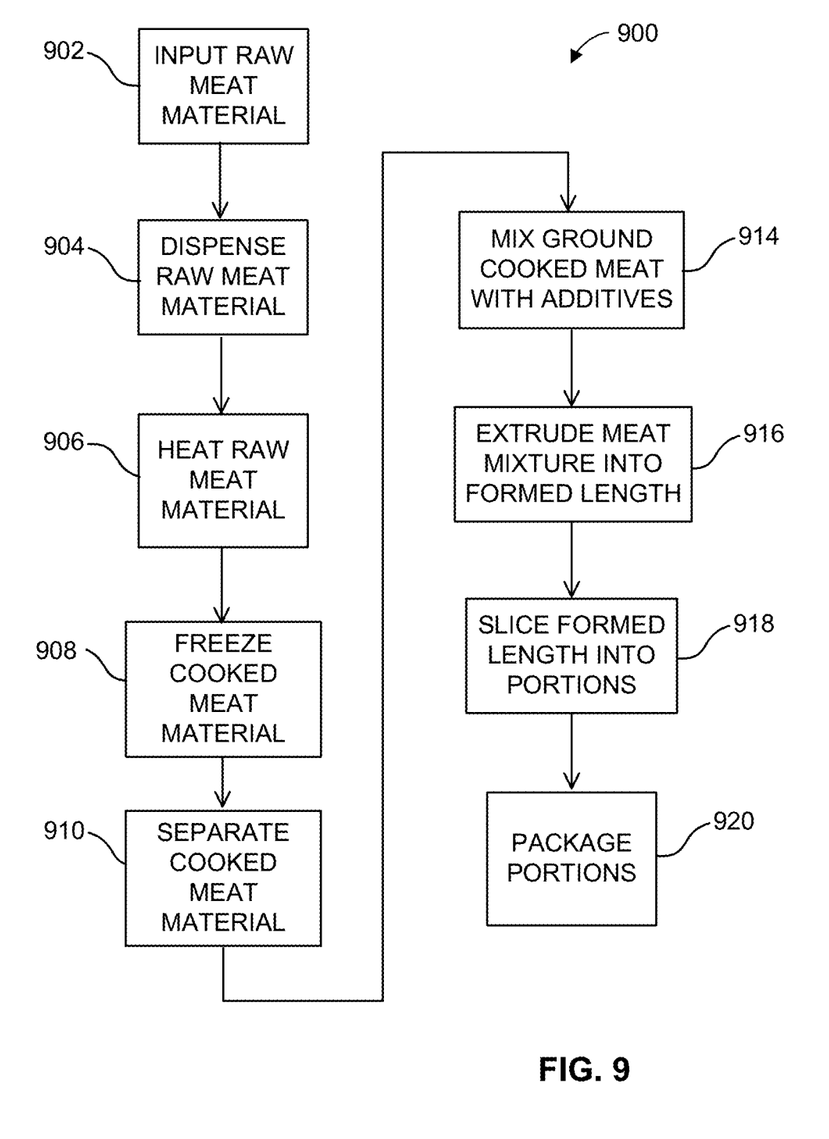
FIG. 9 is a flow chart illustrating another example method of producing meat portions in accordance with the present disclosure.

Referring now to FIG. 9, an example method 900 of producing ready-to-eat meat portions 122 is shown. The apparatus 800 can be used to perform the steps of method 900 in some examples. The description below describes the method 900 performed by the apparatus 800. It should be appreciated, however, that the method and various steps can be performed by other apparatuses and variations of the apparatus 800.

The method 900 can begin at step 902 when raw meat material is input in the apparatus 800. The raw meat material can be input into a hopper, for example. The hopper can be any suitable hopper for food processing such as a stainless steel bin or like that is shaped to funnel the raw meat material toward the dispenser 802. In other examples, the raw meat material can be input into an opening, onto a conveyor or otherwise input for further processing.

The raw meat material can be various types of meats and, in one example, is whole meat muscle. The whole meat muscle can be large portions of animal muscle such as pieces of muscle weighing one pound or more. In the context of processing meat products to make pulled meat products, the raw meat material can be, for example, chicken muscle, pork muscle or other meats. In other examples, the raw meat material 120 can be other types of meat or animal products, including meat scraps, meat pieces less than one pound, animal pieces and the like.

At step 904, the raw meat material can be dispensed. The dispenser 802 can dispense the raw meat material for further processing. The dispenser 802 can also combine the raw meat material or combine the raw meat material to make further processing easier or more efficient. For example, the dispenser 802 can be an extrusion horn. An extrusion horn can be used to combine smaller or lower value pieces of raw meat material into a raw meat muscle mass. The extrusion horn can include, for example, a screw extruder to move the raw meat material through a funnel-like structure to create a raw meat muscle mass for further processing. The dispenser 802 (or the extrusion horn) can be cooled to maintain an appropriate temperature for processing of the raw meat material to inhibit contaminant growth.

Method 900 continues to step 906 at which the raw meat material can be heated. At step 906, the raw meat material can be cooked to result in a fully cooked meat material. The raw meat material that may be shaped into a raw meat muscle mass can be conveyed or otherwise moved from the dispenser 802 to the heater 804. The raw meat material can be heated and fully cooked in the heater 804. Any suitable heating mechanism can be used such as an induction heater, a steam cabinet, smokehouse, oven or the like. The meat material can be heated, for example, until the meat has an internal temperature of approximately 165° F. In other examples, the meat can be cooked to other temperatures that make the meat safe to consume. In the context of producing a pulled meat product, the meat material can be heated for an extended period of time of breakdown the internal tissues in the meat to allow the meat to be easily pulled apart during later processing steps.

At step 908, the cooked meat material can be frozen. The cooked meat material can be frozen in the freezer 108, for example. The cooked meat material can be flash frozen or subjected to any suitable process to lower the temperature of the ground cooked meat material to a temperature between about 5 to about 19° F. In one example, the ground cooked meat material is frozen using an individual quick freezing (IQF) process. In other examples, the ground cooked meat material can be frozen using liquid nitrogen, dry ice or other suitable freezing processes.

At step 910, the cooked meat material can be separated. The cooked meat material can be separated in the separator 808, for example. The separator 808 can use any suitable process to separate the meat material into a pulled meat. For example, the separator 808 can be shredder with fork-like rods that can rotate or otherwise move through the meat material to pull the meat into pulled. In another example, the separator 808 can be a dicer that can shred the meat material to provide a pulled-like consistency. In still another example, the separator can be a cutting device that can cut the meat material into chunks. In a chunking process, the meat material can be separated into meat chunks having a size of a one-half inch cube or greater. The ground meat material can be sliced or shaved to have a suitable meat size for the desired food product. In the example of a Philly Cheese Steak, the meat can be shaved or sliced (as previously described) and such shaved meat can have a thickness of approximately 2 mm. In other examples, other slicers or cutters can be used.

At this stage of the process, the frozen and separated meat material is suitable for consumption and could be packed and shipped to a food preparer. The frozen meat material in the form at this stage of the process is not portioned into a desired shape or quantity of meat material. In addition, if the meat material is packaged in bulk in the form after step 910, the meat material is likely to adhere together in a single mass of meat material and will be difficult to separate into individual portions by the food preparer. The method 900 includes further processing to remedy these issues and are improvements over other processes and apparatuses.

At step 914, the separated cooked meat is mixed with additives. The ground cooked meat is maintained at a temperature below freezing and in one example, is maintained at a temperature between about 5 to about 19° F. In yet another example, the ground cooked meat is maintained at a temperature of about 10 to about 17° F. In yet another example, the ground cooked meat is maintained at a temperature less than or equal to 19° F. The separated cooked meat can be mixed with a suitable binding additive in order to allow the ground meat material to be shaped into a formed length at step 916. In one example, the additive is a starch material. For example, the starch material can be a quick acting starch such as a pregelatinized modified potato starch or a maize-based cold water swelling modified food starch. In other examples, a potato-based, corn-based, or rice-based starch can be used.

The additive can be mixed with the separated cooked meat in order to permit the separated cooked meat to be subsequently shaped into a formed length while also maintaining a desired consistency. In one example, the additive can be added to the separated cooked meat in an amount of about 0.5 to 3% by weight. Tests have shown that an amount less than about 1% tends to result in a separated cooked meat material that crumbles or otherwise falls apart during subsequent processing. Amounts of additive greater than about 3% tends to have a consistency that is undesirable in a final food product. The above test results were conducted with a beef material. If other types of meats or other food products are prepared (other than Philly Cheese Steaks), the amount of additive may be different than the amounts described above.

In the apparatus 800, the additive 128 can be mixed with the separated cooked meat in the mixer 810. The mixer 810 can be paddle blender, for example. The additive and the ground meat material can be mixed in a paddle blender for approximately two minutes. In another example, the separated cooked meat is mixed with the additive for predetermined period of time between about two and about three minutes. The additive and the ground meat material do not need to be mixed under a vacuum. In other examples, a screw vacuum filler can be used. During the mixing process, the separated meat material is maintained at approximately 5 to 19° F. The separated meat material can also be maintained at a temperature of approximately 8 to 12° F. The mixing can be performed for time periods other than two minutes but it is desirable that the additive is evenly mixed and dispersed throughout the separated cooked meat material. When evenly mixed, the ground cooked meat becomes a meat mixture with suitable characteristics such as texture, consistency, temperature, etc. for further processing. While not shown, the meat mixture can be allowed to stand for a suitable stand time to allow the starch in the meat mixture to activate as previously described.

At step 916, the meat mixture can be extruded into a formed length. The meat mixture can be extruded using extruder 812, for example. In one example a screw extruder can be used that can force the meat mixture through an extruder die or extruder tube that can apply pressure to the meat mixture to cause the meat mixture to be formed into a continuous or semi-continuous formed length of the meat mixture. The meat mixture can be transferred, for example, from the mixer 810 to the extruder 812. In one example, the formed length can have a substantially circular or rounded cross-sectional profile. In other examples, the cross-sectional profile can have an oval shape. In still other examples, the formed shape can have other outer profiles such as circular, oval, rectangular, dome-shaped, or other suitable shapes. The extruder 812 can include cooling features that can cool the extrusion die or extrusion tube to maintain the meat mixture and the formed length at a desired temperature. In one example, the meat mixture is maintained at a temperature in the range of about 5 to about 19° F. In another example, the meat mixture can be maintained at a temperature of less than about 20° F. during the forming process. The forming process causes the temperature of the meat mixture to rise due to friction in the extruder 812. The temperature of the meat mixture can be maintained at an appropriate input temperature (e.g., between about 5 and about 19° F.) so that the temperature of the meat mixture is less than about 20° F. when the formed length exits the extruder 812.

The meat mixture with the included binding additive allows the formed length of the meat mixture to maintain its shape despite being formed from a separated meat mixture. If the additive is not present, the formed length of meat mixture tends to fall apart after exiting the extruder 812. With the additive, the formed length maintains the formed shape during subsequent processing.

The method 900 can continue to step 918. At step 918, the formed length of meat mixture can be sliced into meat portions 502 (see FIG. 5). The meat portions 502 can be of any predetermined size. The size can be determined, for example, by a thickness of the slice that is separated from the formed length. The slice thickness can be 12 mm for example. In other examples, the thickness can be in the range of about 10-25 mm. In still other examples, the thickness can be in the range of about 5-35 mm. In still other examples, the size of the meat portion 502 can be determined by a weight of the meat portion. In some examples, the meat portion 502 can have a weight between about 0.1 to about 0.7 pounds. In other examples, the meat portion 502 can have a weight of approximately 0.25, 0.5, 0.75 or 1.0 pounds. In still other examples, the meat portion 502 can be sized so as to correlate to a serving size or to a number of food products. For example, the meat portions 502 can be sized to be one, two, three or more serving sizes or can be sized to produce one, two, three, four or more food products such as meat portions for a pulled pork sandwich. As shown, the meat portions 502 can be shaped as meat patties. In other examples, the meat portions have other shapes such as nuggets, strips, and the like.

The formed length of meat mixture can be transferred from the extruder 812 to the portioner 114 so that the formed length can be sliced into the meat portions 502. In one example, a conveyor or other suitable transfer mechanism can transfer the formed length to the portioner 114. The portioner 114 can be a slicer such as an ultrasonic slicer, rotary slicer or the like. In other examples, the portioner 114 can be separate the formed shape into meat portions 502 using other processing methods such as by die-cutting, scooping, pressing, or the like.

Similar to the example previously described, the formed length can pass under an ultrasonic blade 402 (see FIG. 4). The ultrasonic blade 402 can slice or cut the formed length into the meat portions 502. The ultrasonic blade 402 can vibrate at a desired frequency while the blade 402 moves through the formed length. While this action is performed, the formed length can be maintained at a temperature at or below about 20° F. In this condition, the meat portions 502 can be separated cleanly from the formed length. In one example, the ultrasonic cutter can be positioned near a location at which the formed length of meat mixture exits the extruder 812. In this configuration, the amount of transfer can be minimized and the formed length can be cut into the meat portions 502 upon exiting the extruder 812. In some examples, the ultrasonic cutter and/or the ultrasonic blade 402 can be connected to a transfer mechanism that can move the ultrasonic cutter and/or the ultrasonic blade 402 with the formed length as the formed length exits the extruder 812. In this manner, the formed length can be continuously extruded and the ultrasonic cutter can move with the formed length at a rate approximately the same as the extrusion rate of the formed length. In this manner, the portions can be separated from the formed length in a clean, accurate and repeatable manner.

The method 900 can then proceed to step 920. At step 920, the meat portions 502 can be packaged. For example, the meat portions 502 can be transferred to the packing station 116. In the packing station 116, the meat portions can be bundled together and vacuum packed in film or can be placed into boxes in which the meat portions 502 are separated by wax paper or other suitable separator. After packing, the packaged ready-to-eat meat portions 122 are ready for shipment, delivery and/or sale to a consumer.

The packaged ready-to-eat meat portions 122 are an improvement over existing meats that may be processed and packaged for use in food products. For example, the meat portions 502 in the packages are breakaway portions. As can be appreciated, the meat portions 502 can be easily separated by a consumer into the meat portions 502. Thus, individual quantities or individual servings can be prepared by the food preparer. In this condition, less meat can be wasted and food products can be efficiently prepared by the food preparer.

While not shown, the apparatuses 100, 600 or 800 can include temperature sensors positioned at various locations. The temperature sensors can be used to monitor and/or control the operation of the meat portioning apparatus. For example, the heating or cooling elements that may be included in freezers, heaters or other elements of the meat portioning apparatuses can be controlled based on the temperatures that are indicated by one or more temperature sensors positioned on the meat portioning apparatuses. Of particular importance is the temperature of the meat mixture that enters or is processed in the press 112 or in the extruder 812. A temperature sensor can be positioned on the press 112 or on the extruder 812 to monitor the temperature of the meat mixture and/or the temperature of the press or extrusion die. The temperature sensor can be used, for example, to maintain the temperature of the meat mixture in a range of about 5 to about 19° F. when the meat mixture enters the press 112 or the extruder 812.

As can be seen, the use of the apparatuses 100, 600, 800 and/or the methods 200, 700, 900 can result in significant improvements over existing meat preparation processes. While the methods and apparatuses described above may have been described in the context of a meat used in a Philly Cheese Steak or in a pulled meat application, the teachings and principles of the present disclosure can be applied to other types of meats and food products. For example, the meat portions and related methods can be applied to chicken, pork, lamb, beef, vegetable-based mixtures, soy-mixtures and the like to make portions suitable for making other food products such as tacos, burritos, pulled-pork, pulled-chicken, wraps, gyros, meat sauces, soups, pizzas, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of producing meat portions from whole muscle meat, the method comprising:
   grinding raw whole muscle meat into a ground meat material;
   heating the ground meat material to cook the ground meat material into a cooked ground meat material suitable for consumption;
   freezing the cooked ground meat material;
   mixing the frozen and cooked ground meat material with an additive comprising a starch to produce a meat mixture;
   pressing the meat mixture into a formed shape; and slicing the formed shape into meat portions of a predetermined size;
   wherein the frozen and cooked ground meat material has a temperature of approximately 5 to 19 degrees Fahrenheit when the ground meat material is mixed with the additive.

2. The method of claim 1, wherein the starch comprises a potato-based, corn-based or rice-based starch.

3. The method of claim 2, wherein the starch is added in an amount of about 0.5 to about 3 percent of the meat mixture by weight.

4. The method of claim 1, wherein the formed shape maintains the formed shape until the formed shape is sliced into the meat portions.

5. The method of claim 1, wherein the step of slicing the formed shape into meat portions is performed using an ultrasonic slicer.

6. The method of claim 1, further comprising packaging a plurality of the meat portions together in a package, the plurality of meat portions configured to separate into individual meat portions prior to consumption.

7. The method of claim 1, wherein the meat portions are meat patties.

8. The method of claim 1, wherein the step of mixing the frozen and cooked ground meat material with the additive is performed for about 2 to 3 minutes.

9. The method of claim 1, wherein the frozen and cooked ground meat material is mixed with the additive in a paddle blender.

\* \* \* \* \*